March 3, 1931. S. W. SMITH ET AL 1,794,927

EYESHADE

Filed Dec. 6, 1928

Inventors
Sheldon W. Smith
Edmund S. Smith
J. M. St. John
By
Attorney

Patented Mar. 3, 1931

1,794,927

UNITED STATES PATENT OFFICE

SHELDON W. SMITH AND EDMUND S. SMITH, OF SPRINGVILLE, IOWA

EYE SHADE

Application filed December 6, 1928. Serial No. 324,296.

This invention relates to shades of a partially opaque character designed chiefly as a protection against the glare of approaching automobile headlights.

The object of the invention is to provide such a shade of a very simple and inexpensive construction, adapted to attach frictionally to an eye-glass frame, or any frame of like character, and capable of being adjusted to wider or narrower axes of vision, as desired.

The invention is fully disclosed in the description and claims following, reference being had to the accompanying drawing, in which:—

Figure 1:
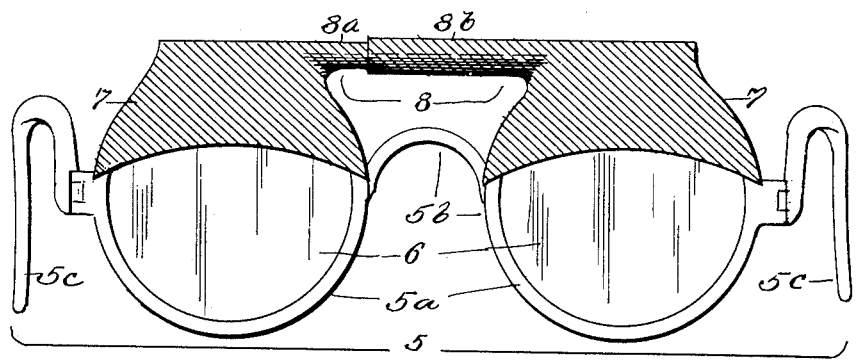
Figure 2:
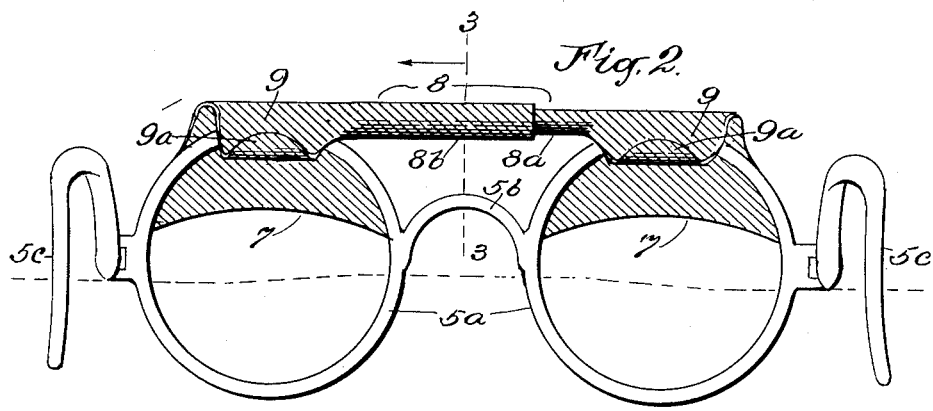
Figure 3:
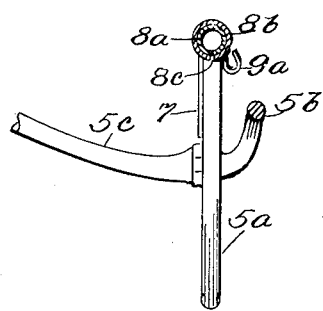

Figure 1 is a front view of eye-shades embodying our invention as in use. Fig. 2 is a rear view of the same. Fig. 3 is a sectional view of the same, in the line 3—3 of Fig. 2, looking toward the left.

In the drawing, the numeral 5 denotes a pair of eye-glasses of a familiar type, having rims 5a, bridge 5b and bows 5c. Lenses 6, shown in Fig. 1, may be dispensed with, if not needed, and even part of the frame, as indicated by the horizontal dotted line, the only requirement being of a frame to rest on or be carried by the nose, and to which the shade may be attached slidably.

The shade is formed of two similar pieces of a suitable semi-opaque material, such as a green celluloid or "pyrolin". Each piece has a shade portion 7, preferably somewhat crescent shaped, to serve as a protection against the above mentioned glare. A lateral wing of each is rolled or molded into a tubular stem 8, one of each pair being a little larger than the other, so that the respective stems, 8a and 8b may connect telescopically. One of the tubular stems should preferably open, as shown at 8c, so that the parts are held normally in position by a moderate pressure and friction. The stems are of such a length that the shades may be adjusted to and from each other to accommodate any widths of visual axis.

From the body of material forming the shade proper a lobe 9 is rolled over so as to meet, or nearly meet, the shade. The terminal portion of the lobe, 9a is given a reverse turn, and the rounded lip so formed makes it easy to slip the clip so formed over the rim of the eye-glass frame. In the sheet material above mentioned there is enough elasticity to impart the pinch necessary in the clip to hold the shade as a whole in position on the frame.

The blanked out pieces of the dimly translucent material above mentioned may be easily rolled to form the stems and clips, after being softened by the application of heat, and retain finally the requisite elasticity to function as desired.

Having thus described our invention, we claim:

1. An eye-shade, comprising a pair of shade members having straight, tubular lateral telescopic stems to connect the members adjustably, and compression clips for attachment to supporting frames, each half of the pair being formed of a single piece of partially translucent material.

2. An eye-shade, comprising a pair of shade members formed of a single piece of partially translucent material, with tubular lateral stems to connect telescopically, one being diametrically elastic, and each having a lobe formed as a compression clip with a teminal out-turned lip, for attachment to a supporting frame.

In testimony whereof we affix our signatures.

SHELDON W. SMITH.
EDMUND S. SMITH.